Jan. 17, 1956

J. S. SCHWINGER 2,731,602

DIRECTIONAL COUPLER

Filed Jan. 10, 1946

INVENTOR
JULIAN S. SCHWINGER
BY
M. C. Hayes
ATTORNEY

United States Patent Office 2,731,602
Patented Jan. 17, 1956

2,731,602
DIRECTIONAL COUPLER

Julian S. Schwinger, Boston, Mass., assignor, by mesne assignments, to the United States of America as represented by the Secretary of the Navy Application January 10, 1946, Serial No. 640,278

10 Claims. (Cl. 333—10)

This invention relates to wave guides and more particularly to directional couplers used in conjunction with wave guides.

Wave guide directional couplers possess properties which make them useful for power monitoring purposes and for impedance measuring or matching. They are used to provide test points in ultra high frequency transmission systems, at which transmitter power may be measured, or at which signals of known amplitude may be introduced in order to measure receiver sensitivity, in a manner that is relatively free from standing waves in the guide. Wave guide directional couplers may also be used to aid in determining standing wave ratio in a wave guide, a knowledge of which is valuable in providing correct termination for the wave guide.

A wave guide directional coupler is a device which, when inserted into a main wave guide in which waves travel in both directions, delivers to an output device in an auxiliary wave guide energy which is largely a function of the amplitude of the wave going in a preferred direction in the main wave guide, and relatively independent of the amplitude of the wave going in the opposite direction in the main wave guide.

A wave guide directional coupler may be further described as a device comprising sections of a main and auxiliary wave guide, and all regions in which there is coupling between the two. Some means of electrical coupling between the two sections of wave guide is included, this means generally taking the form of coupling elements.

Coupling may be generally defined in any suitable manner which specifies the fraction of the energy, proceeding in the preferred direction in the main wave guide, which is delivered to the auxiliary wave guide's output termination. For example coupling may be specified as the ratio of energy delivered to a matched detecting device at the termination of the auxiliary waveguide to energy being introduced into the main waveguide, when the main waveguide is terminated by a matching load.

Directivity may be defined as the ratio between energy appearing at the output of the auxiliary wave guide and energy appearing there if the coupler were turned end for end in the main wave guide, all other conditions remaining unchanged.

Various systems have been devised which couple directionally from one wave guide to another. These systems generally depend for their operation on the longitudinal spacing of coupling elements. Hence it is evident that the operation of these systems is necessarily limited where coupling over a wide range of frequencies is required. Furthermore, adjustment of the coupling elements to take advantage of resonant effects (commonly used to improve operation over a wide range of frequencies) does not overcome the disadvantage that the coupling device depends basically on the longitudinal spacing of the coupling elements.

Generally wave guide directional couplers operate so that the uni-directional output occurs in the same direction that energy travels in the main wave guide system. Where it is desired to feed the directional coupler output back toward the source of power feeding the main wave guide, the use of the above type wave guide directional coupler presents a plumbing problem.

Therefore a primary object of the invention is to provide a wave guide directional coupler which operates inherently over a wide range of frequencies.

Another object of the present invention is to provide a wave guide directional coupler wherein the frequency range throughout which coupling occurs may be increased by experimentally shaping the coupling elements.

A further object of the present invention is to provide a wave guide directional coupler wherein the directional output occurs in the opposite direction to the direction energy travels from a source of energy in a main wave guide system.

With these objects in view the wave guide directional coupler in the present specification has been devised. It comprises two sections of rectangular wave guide joined longitudinally so that the common wall between sections is a portion of a wide side of the first wave guide and a narrow side of the second. The coupling elements are two slot-like apertures in the common wall. These coupling elements are spaced laterally equidistant from the center of the common wall and within the dimensions of the narrow side of the second wave guide. They are spaced longitudinally a quarter of a wave length in the wave guide, which minimizes reflections in the first wave guide caused by any discontinuity introduced by the existence of the coupling elements.

The following specification clarifies the above and other features and objects when taken with the accompanying drawing in which.

Figure 4:
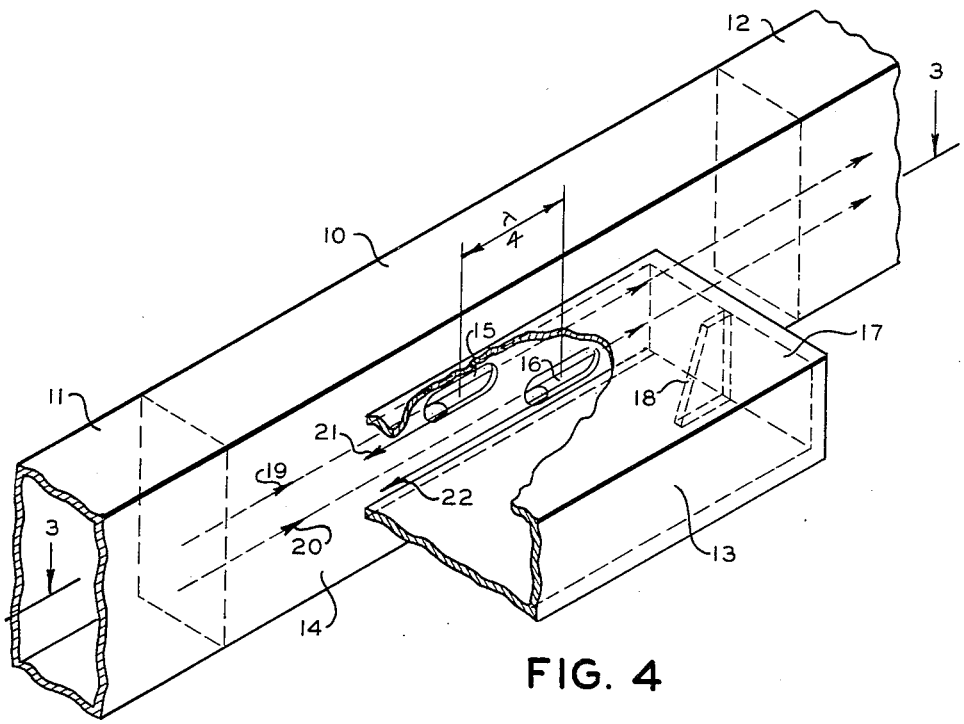
Fig. 4 is an isometric illustration of an embodiment of the present invention.

Referring now to the accompanying drawing and more particularly Fig. 4, member 10 is a section of a main rectangular wave guides 11 and 12. Member 13 is a section of auxiliary wave guide which is joined to the first section 10 by a common wall 14. It may be seen from Fig. 4 that common wall 14 is a portion of a wide side of member 10 and a narrow side of member 13. Members 15 and 16 are apertures in common wall 14, which act as coupling elements between the two sections of wave guide. The geometrical centers of members 15 and 16 are separated longitudinally substantially a quarter wave length in the wave guide, and laterally substantially equal distances from the center of common wall 14 (and of course are included within the narrow dimension of member 13). Member 17 is a plate closing one end of member 13. The closed end is provided with an energy absorbent termination 18.

Arrows 19 and 20 indicate energy traveling forward in the main wave guide 11. In member 10 this energy is separated into two portions, one portion proceeding forward into main wave guide 12, and another portion proceeding through coupling elements 15 and 16 into the auxiliary section of wave guide 13, where it proceeds backward as indicated by arrows 21 and 22.

The present invention may be described as a broadband, reversed-phase, inverse directional coupler. This directional coupler operates on the principle that the phase shift caused by the first element in coupling between the main and auxiliary wave guides will be exactly one hundred and eighty degrees different from the phase shift caused by the second element in coupling between the two wave guides.

Figure 1:
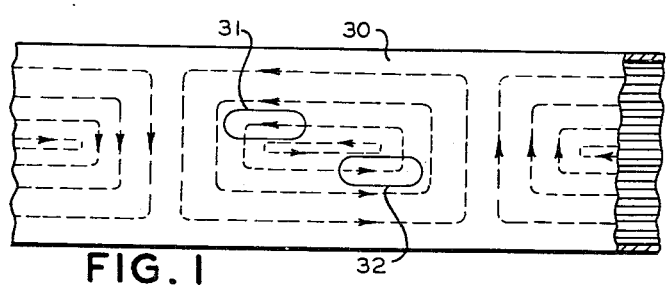
Figs. 1 and 2 are sectional views of a rectangular wave guide illustrating magnetic fields therein.

One hundred and eighty degree phase shift in the coupling elements occurs because the coupling elements couple magnetic fields which are longitudinally opposite in one wave guide to fields which are longitudinally the same in the other. This may be seen by reference to Fig. 1 in which the wide side 30 of a section of wave guide has coupling elements 31 and 32 positioned similarly to members 15 and 16 shown in Fig. 4. Magnetic lines are shown in Fig. 1 as broken lines having arrows indicating mutual direction at a given time with respect to the plane of the wide side of the wave guide. The arrow head shown within the coupling element 31 points in the opposite direction to that shown within coupling element 32. Thus coupling elements 31 and 32, when laterally disposed as they are shown, couple to magnetic fields which are longitudinally opposite in phase in the wave guide.

Figure 2:
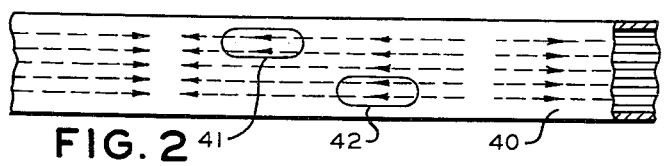

Referring now to Fig. 2, the narrow side 40 of a wave guide has coupling elements 41 and 42 positioned similarly to members 15 and 16 shown in Fig. 4 but located in the narrow side of the wave guide, as in auxiliary wave guide 13. Magnetic lines are shown as broken lines having arrows indicating mutual direction at a given time with respect to the plane of the narrow side of the wave guide. The arrow head shown within coupling element 41 points in the same direction as that shown within coupling element 42. Thus coupling elements 41 and 42, when positioned as shown on the narrow side of a wave guide, couple to magnetic fields which are longitudinally the same in phase in the wave guide.

Figure 3:
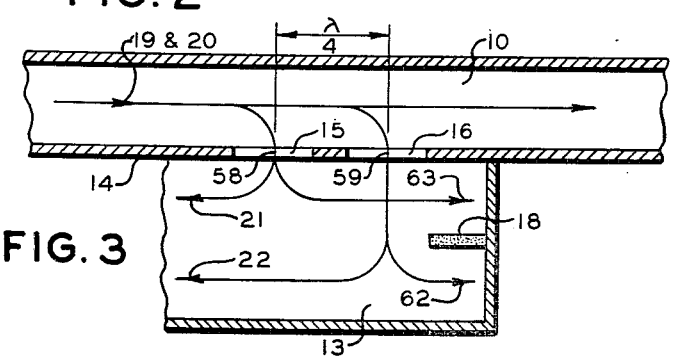
Fig. 3 is a sectional view taken in the plane of the line 3—3 of Fig. 4.

Fig. 3 is a section of the directional coupler taken approximately in the plane of the line 3—3 in Fig. 4. The main wave guide section 10 is shown joined to auxiliary wave guide section 13. The coupling elements are shown as apertures 15 and 16 in common wall 14. Arrows 19, 20 indicate energy traveling forward into the input end of the section of main wave guide. Lines 58 and 59 indicate energy passing thru the coupling elements into auxiliary wave guide 13. Arrows 21 and 22 indicate energy traveling backward, and arrows 62 and 63 indicate energy traveling forward in auxiliary wave guide 13.

In Fig. 3 it will be seen that waves indicated at 62 and 63 which have travelled equal path lengths from the main wave guide 10 to the auxiliary wave guide 13 will be of opposite phase and interfere destructively (due to the one hundred and eighty degrees phase shift shown in Fig. 1 at the coupling elements 31 and 32). On the contrary, waves indicated at 21 and 22 which have travelled path lengths differing by two quarter wave lengths from main wave guide 10 to auxiliary wave guide 13 will be in phase, and will "interfere constructively" or add (again, due to the additional one hundred and eighty degree phase shift in the coupling elements).

Energy coming out of the auxiliary wave guide is travelling in the opposite direction from that in the main wave guide, which is the reason for describing the coupler as an inverse coupler.

It is evident that energy, in the main wave guide traveling backward from that shown in Fig. 3 likewise will be coupled into the auxiliary wave guide in a direction inverse to that in the main wave guide. Accordingly, an energy absorbent termination 18 is placed at the end of the auxiliary wave guide section opposite from the original input end of the main wave guide. This energy absorbent termination functions both to absorb any "wrong way" energy which is coupled into the auxiliary wave guide thereby preventing its further reflection, and to present a satisfactory impedance match looking into the output termination of the auxiliary wave guide. This energy absorbent termination 18 may be in the form of a tapering member cut from a strip of polyiron.

It is apparent from the above that a portion of the energy traveling in one direction only in the main wave guide will be coupled into and travel out of the auxiliary wave guide. Therefore the present wave guide directional coupler operates substantially independently of standing waves in the main wave guide (because standing waves depend upon energy flowing in opposite directions in the same medium).

Directivity in the present invention occurs throughout a wide range of frequencies. This characteristic is known to the art as being "broad band." As has been shown above, directivity in the present directional coupler is not primarily a function of quarter wave length longitudinal spacing of the coupling elements, but is primarily a function of phase shift in the coupling elements. Hence the directional coupler is inherently operative over a wide range of frequencies.

The amount of attenuation in the coupling between the main and auxiliary sections of wave guide in the present directional coupler is a function of both the size and lateral spacing of the coupling elements. It is known to the art that the longitudinal magnetic field is weaker at the center of the wide side of a rectangular wave guide than it is at regions away from the center. Therefore increasing the lateral spacing increases the coupling.

Figure 5:
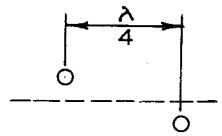
Fig. 5 shows one form of coupling apertures.
Figure 6:
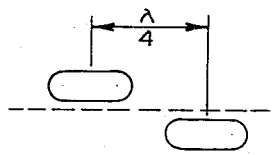
Fig. 6 shows another form of coupling apertures.

The coupling elements may be shaped to take advantage of resonant effects in order to further expand the range of frequencies over which the directional coupler is operative. Fig. 6 illustrates coupling elements which are experimentally shaped into wide slots to approach resonance at some desired frequency. Fig. 5 illustrates coupling elements in the form of small holes which operate over a narrower frequency range than those of Fig. 6. In Fig. 5 the coupling occurs in a smaller area than that in Fig. 6. Therefore the coupling in Fig. 5 is attenuated with respect to that in Fig. 6. Also in Fig. 5 no attempt has been made to shape the elements to approach resonance.

It is believed that the construction and mode of operation, as well as the advantages of this improved directional coupler, will be understood from the foregoing detailed description thereof. It will be understood that while the invention is shown and described in a preferred form, changes may be made in the structure disclosed without departing from the spirit of the invention, as sought to be defined in the following claims. In the claims, a quarter wave length distance is referred to for convenience, but this may be three quarter waves, or five quarter waves, etc.

What is claimed is:

1. In a wave guide system, directional coupling means comprising a first section of rectangular wave guide joined longitudinally to a second section of rectangular wave guide so that the common wall between said sections of wave guide is part of a wide side of said first section and a narrow side of said second section, said common wall being provided with apertures spaced apart laterally each side of center within the narrow side of said second section and spaced apart longitudinally a distance of substantially a quarter wave length in the wave guide.

2. A wave guide directional coupler for coupling and attenuating power from one wave guide to another wave guide independently of any standing wave in said first named wave guide, comprising a first and second section of rectangular wave guide joined longitudinally together by a common wall, said common wall being part of a wide side of said first section and a narrow side of said second section, aperture coupling elements spaced laterally in said common wall equidistant from the center of and within the boundaries of the narrow side of said second section and spaced longitudinally apart substantially a quarter wave length in the wave guide, and an energy absorbing termination at the end of said second section of rectangular wave guide which is opposite to the input end of said first section of wave guide.

3. A wave guide directional coupler comprising, a section of main rectangular wave guide, a section of auxiliary rectangular wave guide, there being a common wall between said wave guide sections said common wall comprising a part of a wide side of said section of main rectangular wave guide and a narrow side of said auxiliary wave guide, means for directionally coupling energy from said main wave guide into said auxiliary wave guide, said means comprising coupling elements having the form of longitudinal slot-like apertures disposed laterally each side of center of said common wall and within the narrow dimension of said auxiliary wave guide and separated longitudinally a quarter of a wave length in the wave guide, the magnitude of coupling between said main and auxiliary sections of wave guide being determined by either the amount of lateral spacing of said coupling elements from the center of said common wall, or the size of said coupling elements or both, the bandwidth throughout which coupling between said main and auxiliary sections of wave guide occurs being partially determined by the size and shape of said coupling elements, energy absorbent termination means disposed at the end of said auxiliary wave guide section which is opposite from its output end, whereby a portion of the energy travelling in one direction only in said main rectangular wave guide travels out of said auxiliary wave guide.

4. A wave guide directional coupler for coupling energy inversely from one wave guide to another wave guide, comprising a first rectangular wave guide through which energy may pass in both directions, a second rectangular wave guide through which energy passes in one direction from an absorption end toward an output end, a part of a wide side of said first wave guide and a narrow side of said second wave guide, there being a common wall, slot-like coupling elements through said common wall spaced laterally equidistant from the center and spaced longitudinally substantially a quarter wave length in the wave guide, energy absorbent termination means disposed at the absorption end of said second rectangular wave guide, whereby waves traveling forward in said first rectangular wave guide when coupled into said second rectangular wave guide interfere constructively in the direction of the output end and interfere destructively in the direction of the absorbent termination means, and whereby waves travelling backward in said first rectangular wave guide when coupled into said second rectangular wave guide interfere destructively in the direction of the output end, and in the opposite direction interfere constructively and are dissipated in said energy absorbent termination, said wave guide directional coupler being inherently operative throughout a wide range of frequencies, and its directivity being substantially independent of the longitudinal spacing between said coupling elements.

5. In a wave guide system, directional coupling means comprising a first section of rectangular wave guide and a second section of rectangular wave guide, first and second means for coupling the magnetic field of said first section to the magnetic field of said second section, said first and second coupling means communicating with said first section at first and second points disposed on opposite sides of the longitudinal center line of a broad wall of said first section, said first and second points being spaced apart longitudinally of said first section by an odd number of quarter wave lengths, said first and second coupling means communicating with the same narrow wall of said second section at third and fourth points, the longitudinal spacing between said third and fourth points being less than one-half a wave length.

6. In a wave guide system, directional coupling means comprising a first section of rectangular wave guide and a second section of rectangular wave guide, first and second means for coupling the magnetic field of said first section to the magnetic field of said second section, said first and second coupling means communicating with said first section at first and second points on the same broad wall, said points being disposed on opposite sides of the longitudinal center line of said broad wall, said first and second points being spaced apart longitudinally of said first section by an odd number of quarter wave lengths, said first and second coupling means communicating with the same narrow wall of said second section at points spaced apart by any odd number of quarter wave lengths.

7. In a wave guide system, directional coupling means comprising a first section of rectangular wave guide, a second section of rectangular wave guide disposed in a substantially parallel relationship to said first section, a narrow wall of said second section being in juxtaposition with a broad wall of said first section, said juxtaposed walls being formed with first and second apertures each adapted to couple energy between said two sections of wave guide, said first and second apertures being disposed on opposite sides of the longitudinal center line of said wider wall and spaced apart longitudinally of said sections by an odd number of quarter wave lengths, said odd number including unity.

8. In a wave guide system, directional coupling means comprising a first section of rectangular wave guide, a second section of rectangular wave guide disposed in a substantially parallel relationship to said first section, a narrower wall of said second section being in juxtaposition with a broad wall of said first section, said juxtaposed walls being formed with first and second apertures therein, each of said apertures extending through said narrower wall and said wider wall and each of said apertures being adapted to couple energy between said two sections of wave guide, said first and second apertures being disposed on opposite sides of the longitudinal center line of said wider wall and at equal distances therefrom, said apertures being spaced apart longitudinally of said sections by a distance equal to an odd number of quarter wave lengths.

9. In a wave guide system, directional coupling means comprising a first section of rectangular wave guide joined longitudinally to a second section of rectangular wave guide so that the common wall between said sections of wave guide is part of a wide side of said first section and a narrow side of said second section, said common wall being provided with apertures spaced apart laterally each side of center within the narrow side of said second section and spaced apart longitudinally a distance of an odd number of quarter wave lengths in the wave guide.

10. In a wave guide system, directional coupling means comprising a first section of rectangular wave guide joined longitudinally to a second section of rectangular wave guide so that the central portion of the wider wall of said first section forms a narrower wall of said second section, said central portion being provided with elongated apertures spaced apart laterally each side of the longitudinal center line of said wider wall and spaced apart longitudinally a distance of substantially a quarter wave length at the desired operating frequency, said elongated apertures acting as resonant apertures at said desired operating frequency.

References Cited in the file of this patent

UNITED STATES PATENTS 2,423,390    Korman _____ July 1, 1947

FOREIGN PATENTS 545,936    Great Britain _____ June 18, 1942